Jan. 29, 1957 G. W. STANLEY 2,779,067
DEFROSTING ATTACHMENT FOR WINDSHIELDS
Filed Sept. 17, 1954
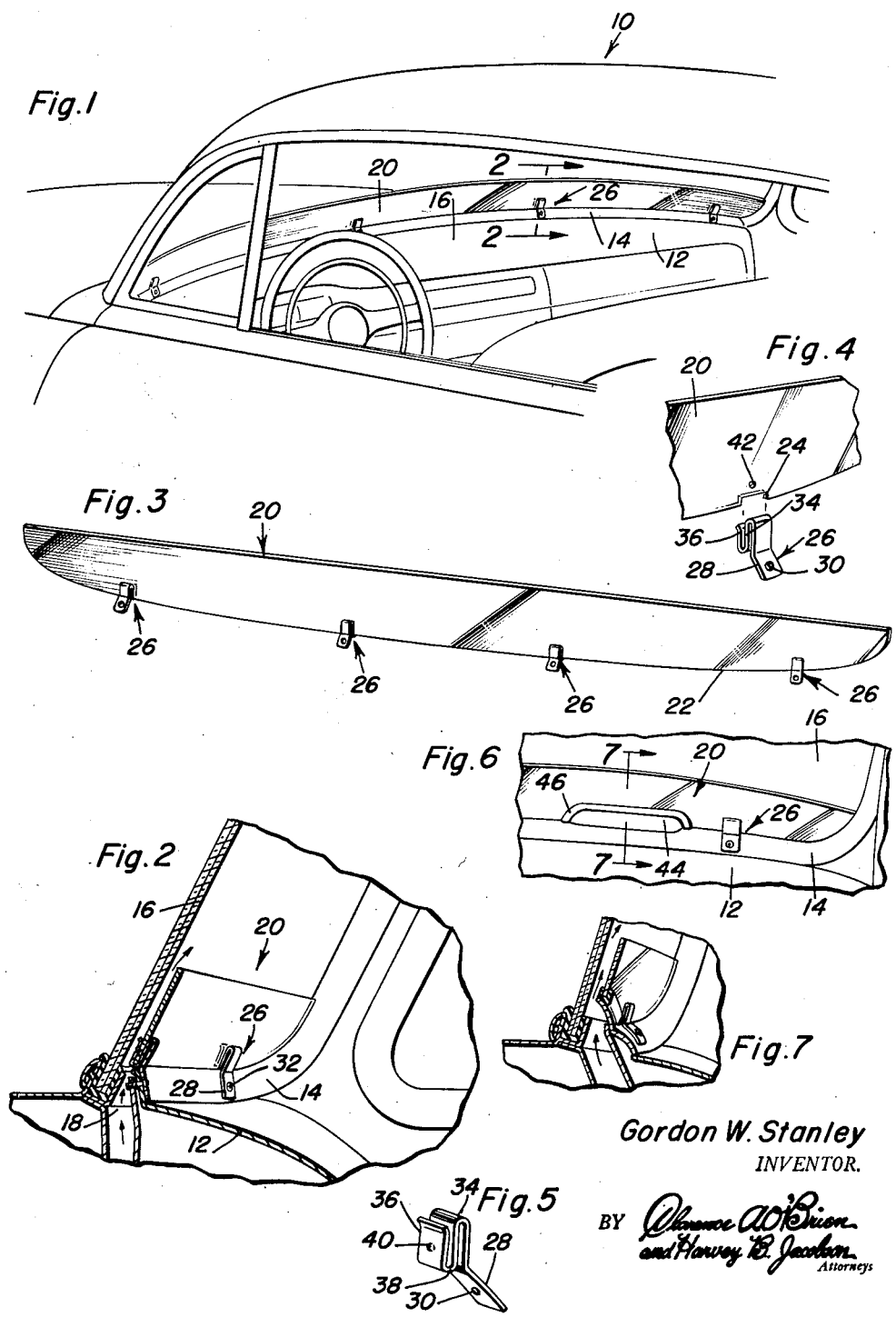
Gordon W. Stanley
INVENTOR.

2,779,067
Patented Jan. 29, 1957

2,779,067

DEFROSTING ATTACHMENT FOR WINDSHIELDS

Gordon W. Stanley, Brandon, Manitoba, Canada

Application September 17, 1954, Serial No. 456,829

1 Claim. (Cl. 20—40.5)

The present invention relates to a windshield attachment for aiding in the diffusion of warm air over the windshield for defrosting the windshield.

The primary object of the present invention is to provide a windshield attachment for windshields such as those of automotive vehicles and the like which will serve to more efficiently diffuse the warm air from the defrosting ducts over the windshield thereby facilitating a more efficient defrosting action on the windshield.

A highly important object of the invention is to provide an attachment of the foregoing described character which may be attached to the conventional windshield molding without modification of the molding and which will conform to the curvature of the windshield in spaced relation thereto without interfering with the normal passage of air from the defroster ducts over the windshield.

A still further object of the invention is in the provision of a defroster attachment for aiding in the retention of warm air from the defroster ducts adjacent the windshield which is capable of quick and simple attachment to the windshield molding and the mounting on such molding and which may be attached and detached from its fastening means without the use of tools and without disturbing the attachment of the fastening means to the windshield molding.

A final object of the invention to be mentioned specifically is in the provision of a flexible, transparent, air deflector strip for emplacement adjacent to and spaced from a windshield for distributing warm air over the windshield which is exceedingly simple of construction and economical of manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view looking through the side window of an automotive vehicle disclosing the defroster attachment constituting the invention in place mounted on a windshield molding;

Figure 2 is a cross sectional view of the device in place on the windshield molding taken substantially along the plane of section line 2—2 of Figure 1;

Figure 3 is a perspective view of the attachment per se with the fastening clips therefor;

Figure 4 is an enlarged detail view in perspective of a portion of the device disclosed in the manner of fastening the fastening clips to the attachment;

Figure 5 is a perspective view of one of the fastening clips per se;

Figure 6 is an enlarged detail view of a portion of a slightly modified attachment strip shaped to fit raised defroster duct openings in the windshield molding; and Figure 7 is a cross sectional view taken substantially along the plane of section line 7—7 of Figure 6.

In the drawings, an automotive vehicle is designated generally by the numeral 10 as having the customary instrument panel 12 and interior molding strip 14 around the windshield 16 of the automobile.

As is conventional, defrosting ducts 18 which conduct warm air from the heating system of the automobile open at spaced points along the lower edge of the windshield molding 14 to distribute warm air over the windshield to prevent the formation of ice, frost and fog thereon.

In the normal operation of the defroster, the warm air is distributed over the windshield in such a manner that the portion of the windshield adjacent the lower edge of the molding 14 around the windshield is first cleared of frost and as the air further circulates over the windshield, wider areas above this molding are cleared on the windshield until the windshield is cleared sufficiently for the driver's vision therethrough. Unfortunately, as the air rises, it tends to spread away from the windshield so that the defrosting action for those portions of the windshield above the lower or base portion of the molding 14 becomes progressively slower necessitating considerable time particularly on cold mornings to provide a sufficient defrosting action on the windshield to enable safe driving of the vehicle. Basically, the present invention constitutes a flexible, transparent normally flat strip 20 which is adapted for attachment to the lower edge of the molding 14 of the windshield to conform to the curvature of the windshield in spaced relation thereto to more efficiently retain the warm air against the windshield some distance above the lower edge molding 14 to enable the primary defrosting action of the air from the warm air ducts to take place a sufficient distance above the lower edge of the windshield to almost immediately clear that portion of the windshield necessary to be cleared to enable proper visibility for the driver of the vehicle.

The strip is preferably formed in the shape of a flat plate of a suitable flexible plastic. The upper edge of the strip 20 is straight while the lower edge thereof is curved to fit the contour of the molding strip 14 along the lower edge thereof and at the corners of the molding adjacent the lower edge as at 22.

At spaced points along the lower edge, the flat strip 20 is notched as at 24 and fastening clips 26 received in these notches.

Each fastening clip 26 is in the form of a suitable resilient strap type fastener, the strap possessing sufficient rigidity for attachment purposes to the molding 14 and detachable attachment to the strip 20. The configuration of the clip is that of a flat strap having a flat end portion 28 with an aperture 30 therethrough whereby this end portion 28 of the strip may be held in place by the molding strip fasteners 32.

The other end portion of each clip 26 is bent to form a U-shaped seat having first and second legs 34 and 36 joined by a web portion 38. The U-shaped portion opens upwardly so that legs 34 and 36 straddle the strip 20 adjacent the lower edge thereof with a notched portion 24 of the strip straddling the web 38 of the U-shaped seat.

To detachably retain each clip to its associated portion of the strip 20, leg 36 of each clip is provided with an inwardly projecting detent 40 and the portion of the strip 20 above each notch provided with a corresponding recess 42 within which the detent 40 resiliently seats.

As will be noted from the drawings, the upper end portion providing the U-shaped portion of each clip member is disposed at an angle to the lower end portion 28 of the clip, the purpose of this change in angularity being to enable the flexible strip 20 to be mounted in a position parallel to but spaced from the windshield 16.

To mount the attachment, the clips 26 are first secured to the lower edge of the molding 14 of the windshield by first removing the molding fasteners 32 and then projecting these fasteners through the aperture 30 of the lower portion 28 of each clip and again securing the fastener in place in the molding. Then, the strip 20 is simply pressed into the U-shaped seats formed at the upper end portions of the clips and flexed as necessary to follow the curve of the molding and the windshield. The result is a quickly mountable and demountable transparent, flexible sheet or strip which will guide the defrosting air from the defrosting ducts 18 for a greater distance upwardly along the windshield prior to diffusion of this air away from the windshield into the interior of the car. The over-all effect of the mounting is to raise the beginning point of the defrosting effect to a position wherein the driver's vision is almost immediately cleared up rather than allowing the defrosting effect to work slowly up from the molding base of the windshield. The device not only enables the faster defrosting of the windshield than is ordinary by utilizing only the defroster duct openings but enables a more complete defrosting action of the windshield in less length of time than utilizing the ducts per se.

Further, the unit is such that it may be attached and detached at will without the use of tools or any particular mechanical skill.

Noting the modification shown in Figures 6 and 7, it will be seen that the construction of the strip and the attachment of the strip 20 to the windshield molding 14 are substantially the same as that previously described. However, in some automobiles, the duct openings of the warm air ducts to the windshield for defrosting the same are in the form of raised shields 44 on the molding. Consequently, the lower edge of the strip 20 is cut out at these points to fit over the raised shields 44 of the ducts and a resilient, rubber gasket or the like 46 emplaced over this cut out lower edge portion of the strip to seal the strip to the shield adjacent the shield opening in the molding.

With either modification of the invention, it will be noted that the strip is substantially equal to the length of the windshield but only a fraction of the height thereof so that in no event will it hinder or interfere with driver vision through the windshield.

The attachment as a whole is a practical and convenient means for aiding in the defrosting of the windshields of automotive vehicles, airplanes and the like which serves as a convenience for driver or pilot vision.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An attachment for aiding in the defrosting of windshields comprising an elongated, flexible, flat transparent strip, the length of the strip being substantially equal to the width of a windshield, the height of the strip being considerably less than the height of a windshield with which the attachment is to be used whereby to leave the major portion of the windshield uncovered by the strip, the lower edge of the strip being contoured to the shape of the lower edge of a windshield with which the attachment is to be used, and fastening means adapted to be attached to the windshield molding, cooperating means on said strip and said fastening means detachably securing said strip to said fastening means, said fastening means includes a plurality of clips, each of said clips comprising a member formed into a U-shaped seat at one end thereof straddling the strip, an inwardly projecting detent on one leg of the seat, said strip having a depression within which said detent releasably seats.

References Cited in the file of this patent
UNITED STATES PATENTS

| | | |
|---|---|---|
| 507,731 | Horne | Oct. 31, 1893 |
| 2,096,901 | Knecht | Oct. 26, 1937 |
| 2,177,187 | Olsen | Oct. 24, 1939 |
| 2,659,942 | Iverson | Nov. 24, 1953 |